United States Patent [19]

Budzik, Jr. et al.

[11] Patent Number: 5,363,716
[45] Date of Patent: Nov. 15, 1994

[54] TILT-TELESCOPE STEERING COLUMN

[75] Inventors: John A. Budzik, Jr.; Mark A. Cartwright, both of Lafayette; Mark A. Hoagland, Newtown; Samuel G. Johnson, III; Murthy N. Nemani, both of West Lafayette; Gerald K. Oxley; Philip S. Peterson, both of Lafayette; Gerald W. Thomas, West Lafayette; Frederick D. Venable, Lafayette; Daniel L. White, Covington, all of Ind.

[73] Assignee: TRW Inc., Lyndhurst, Ohio

[21] Appl. No.: 41,729

[22] Filed: Apr. 1, 1993

[51] Int. Cl.⁵ .............................................. B62D 1/18
[52] U.S. Cl. .......................................... 74/493; 74/531; 280/775
[58] Field of Search ................... 74/493, 531; 280/775

[56] References Cited

U.S. PATENT DOCUMENTS

| | | | |
|---|---|---|---|
| 3,302,478 | 2/1967 | Pauwels | 74/493 |
| 4,041,796 | 8/1977 | Shishido | 74/531 X |
| 4,240,305 | 12/1980 | Denaldi et al. | |
| 4,449,419 | 5/1984 | Brugeura | |
| 4,656,888 | 4/1987 | Schmitz | 74/493 |
| 4,709,592 | 12/1987 | Andersson | 74/531 X |
| 4,774,851 | 10/1988 | Iwanami et al. | |
| 4,972,732 | 11/1990 | Venable et al. | |
| 5,088,767 | 2/1992 | Hoblingre et al. | |

Primary Examiner—David W. Laub
Attorney, Agent, or Firm—Tarolli, Sundheim & Covell

[57] ABSTRACT

A steering column has a first steering column member movable axially relative to a second steering column member. An input shaft is connected with the steering wheel and supported on the first steering column member for pivotable movement relative to the first steering column member. A first lock locks the first steering column member in any one of an infinite number of axial positions relative to the second steering column member. A second lock locks the input shaft in any one of an infinite number of pivot positions relative to the first steering column member. A member to unlock the first and second locks has a first position in which the first lock is unlocked and the second lock is locked. The member has another position in which the second lock means is unlocked and the first lock is locked.

16 Claims, 13 Drawing Sheets

TILT-TELESCOPE STEERING COLUMN

BACKGROUND OF THE INVENTION

The present invention relates to a tilt-telescope steering column, and more specifically to a tilt-telescope steering column in which a first steering column member can be locked in any one of an infinite number of axial positions relative to a second steering column member and an input shaft can be locked in any one of an infinite number of pivot positions relative to the first steering column member.

A known steering column is disclosed in U.S. Pat. No. 4,449,419. U.S. Pat. No. 4,449,419 discloses a steering column in which a first steering column member can be adjusted to an infinite number of axial positions relative to a second steering column member and an input shaft can be positioned in any one of an infinite number of pivot positions relative to the first steering column member. A fastener is loosened to adjust the position of the first steering column member relative to the second steering column member and the input shaft relative to the first steering column member. The fastener is then tightened to hold the steering wheel in the adjusted position.

SUMMARY OF THE INVENTION

The steering column of the present invention includes first and second coaxial steering column members. The first steering column member telescopes axially relative to the second steering column member. A telescope locking means locks the first steering column member in any one of an infinite number of axial positions relative to the second steering column member. An input shaft connectable with a steering wheel is supported on the first steering column member for pivotal movement relative to the first steering column member. A tilt locking means locks the input shaft in any one of an infinite number of pivot positions relative to the first steering column member.

A member unlocks the telescope and tilt locking means. The member has a first position in which the telescope and tilt locking means are both locked. The member is biased into its first position so that the telescope and tilt locking means are normally locked. The member has a second position in which the telescope locking means is unlocked and the tilt locking means is locked. The member has a third position in which the tilt locking means is unlocked and the telescope locking means is locked. The member selectively controls the telescope locking means and the tilt locking means. Thus, the first steering column member can be moved axially relative to the second steering column member while the input shaft remains in a fixed pivot position relative to the first steering column member. Also, the input shaft can be pivoted relative to the first steering column member while the first steering column member remains in a fixed axial position relative to the second steering column member.

The telescope locking means comprises a first member connected to the first steering column member and a second member connected to a housing of the steering column which rotatably supports the second steering column member. A friction force is applied by the telescope locking means between the first and second members to prevent relative movement between the first and second members. The tilt locking means comprises the first member of the telescope locking means and a third member connected to the input shaft. A friction force is applied by the tilt locking means between the first and third members to prevent relative movement between the first and third members.

In a first embodiment of the present invention, a compression spring applies a force to clamp a bracket, connected to the first steering column member, to the housing to prevent relative axial movement between the first and second steering column members. The spring also applies a force to clamp a tilt lock bar connected to the input shaft to the bracket to prevent pivotal movement of the input shaft relative to the first steering column member.

The member for unlocking the telescope locking means and the tilt locking means comprises a handle. When the handle is moved from its first position to its second position, the spring force clamping the bracket to the housing is released without releasing the force clamping the bracket to the tilt lock bar. The first steering column member is then axially movable relative to the second steering column member. Upon release of the handle, the spring moves the handle back to its first position and clamps the bracket to the housing.

When the handle is moved from its first position to its third position, the spring force clamping the bracket to the tilt lock bar is released without releasing the force clamping the bracket to the housing. The input shaft is then pivotable relative to the first steering column member. Upon release of the handle, the spring moves the handle back to its first position and clamps the bracket to the tilt lock bar.

In a second embodiment of the present invention, the telescope lock means includes a telescope lock bar attached to the housing. The telescope lock bar extends through a first tubular member connected to a bracket that is connected to the first steering column member. The telescope lock bar also extends through a telescope lock spring fixed at one end to and located within the tubular member. The telescope lock spring is normally tightly wound around the telescope lock bar to prevent relative movement between the bracket and the telescope lock bar. When a handle is moved from a first position to a second position, the handle causes the telescope lock spring to unwind from the telescope lock bar and permit axial movement of the first steering column member relative to the second steering column member. Upon release of the handle, the telescope lock spring moves the handle back to its first locked position and is tightly wound around the telescope bar.

The tilt lock means includes a tilt lock bar attached to the input shaft. The tilt lock bar extends through a second tubular member pivotally connected to the bracket and a tilt lock spring fixed at one end to and located within the second tubular member. The tilt lock spring is normally tightly wound around the tilt lock bar to prevent relative movement between the bracket and the tilt lock bar. When the handle is moved from its first position to a third position, the tilt lock spring is unwound from the tilt lock bar and the input shaft is pivotable relative to the first steering column member. Upon release of the handle, the tilt lock spring moves the handle back to first position and is tightly wound around the tilt lock bar.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF THE PREFERRED EMBODIMENTS

Figure 1:
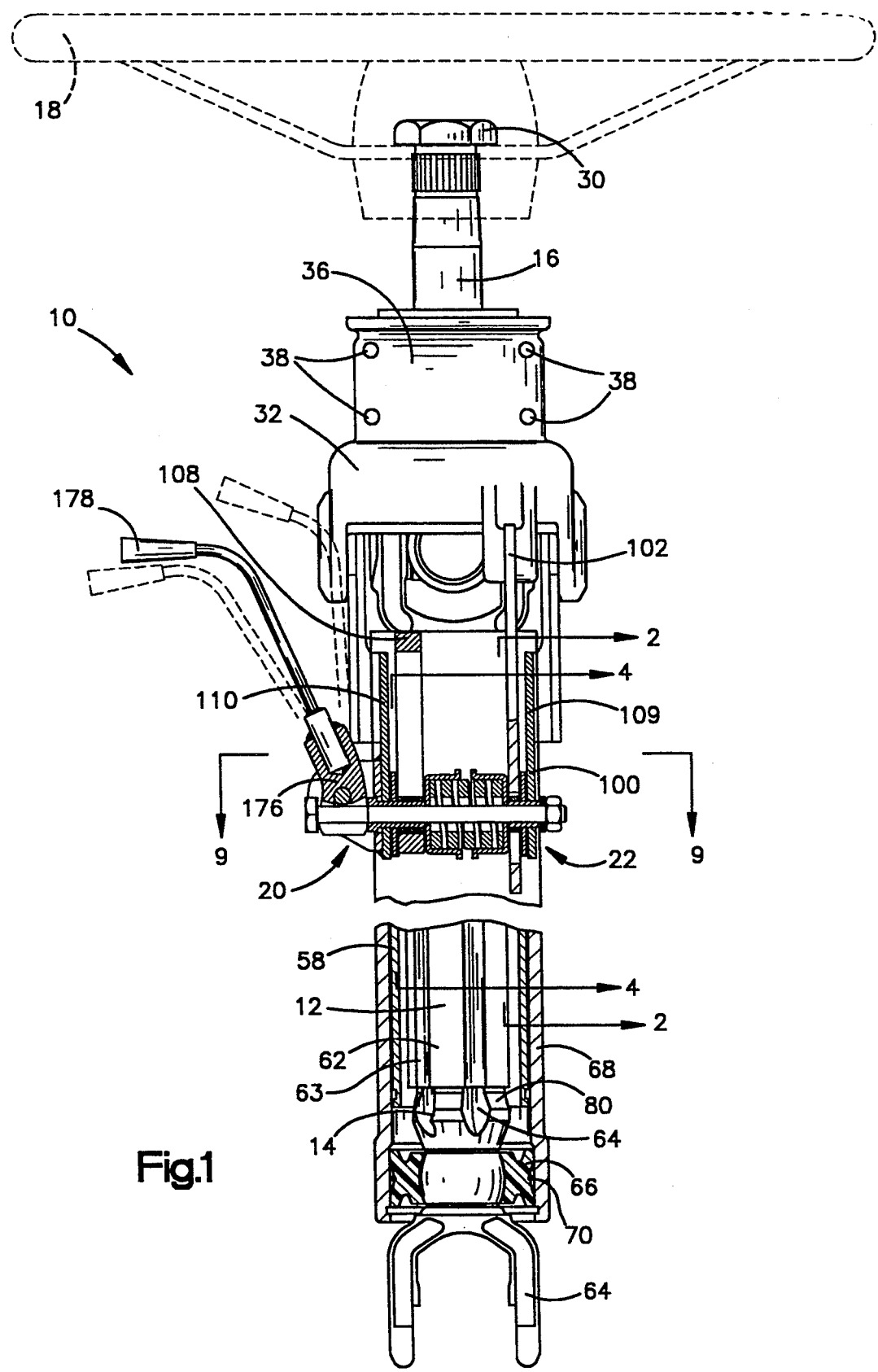
FIG. 1 is a sectional view of a first embodiment of a steering column of the present invention.

A first embodiment of the present invention comprises an axially and angularly adjustable vehicle steering column 10 (FIG. 1). The steering column 10 includes a pair of steering column members 12, 14 and an input shaft 16. A vehicle steering wheel 18 is attached to the input shaft 16 by a nut 30. The input shaft 16 and steering column members 12, 14 rotate upon rotation of the vehicle steering wheel 18. The steering column members 12, 14 telescope to effect axial adjustment of the steering wheel 18, see FIGS. 4 and 5. The input shaft 16 is pivotable relative to the steering column member 12 to effect angular adjustment of the steering wheel 18, see FIGS. 2 and 3.

A releasable telescope locking mechanism 20 (FIG. 1) locks the steering column members 12, 14 in any one of an infinite number of telescoped positions. A releasable tilt locking mechanism 22 locks the input shaft 16 in any one of an infinite number of pivot positions relative to the steering column member 12.

Figure 10:
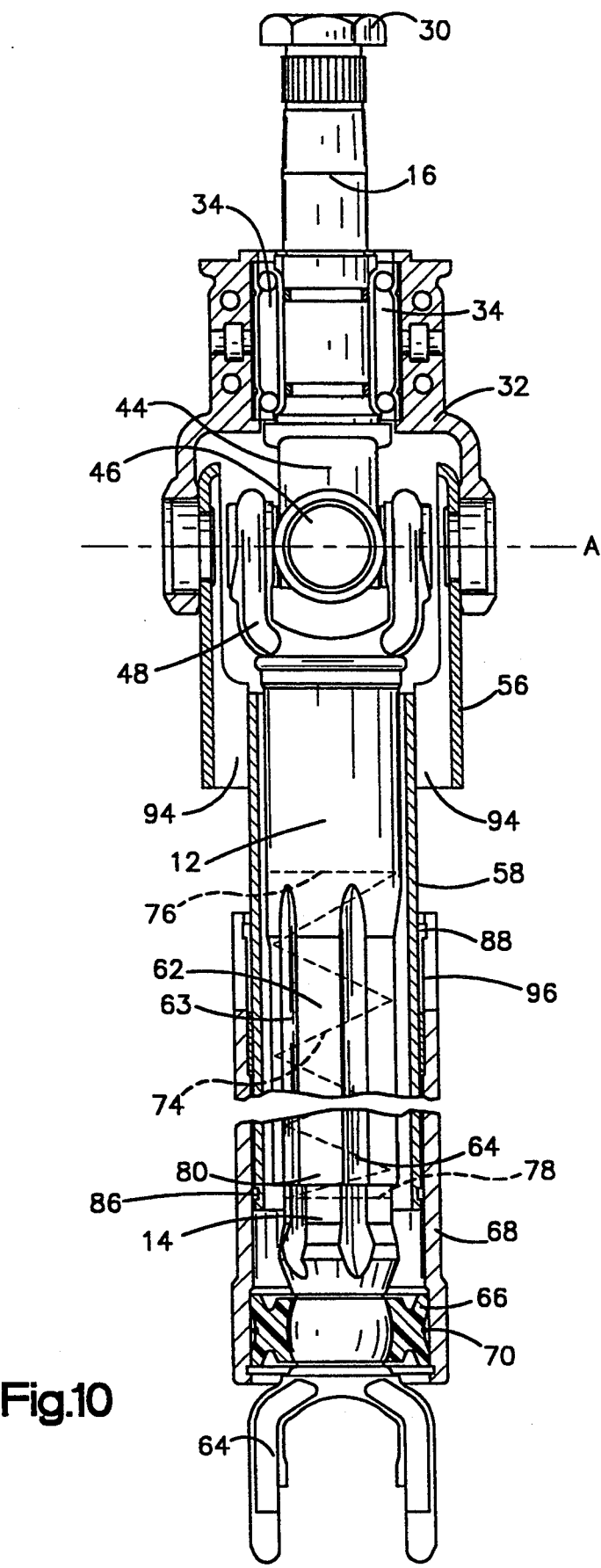
FIG. 10 is a sectional view of the steering column taken along the line 10—10 of FIG. 9.

The input shaft 16 extends into an upper housing 32 (FIG. 10). Bearings 34 (shown schematically in FIG. 10) are located in the upper housing 32 and support the input shaft 16 for rotation relative to the upper housing 32. A cover 36 (FIGS. 1 and 2) is connected to the upper housing 32 by screws 38. The cover 36 is removable from the upper housing 32 so that the bearings 34 may be reached for repair and maintenance.

The input shaft 16 is connected to a yoke 44 (FIG. 10) of a universal joint 46. Another yoke 48 of the universal joint 46 is connected to the steering column member 12. The input shaft 16 can pivot, relative to the steering column member 12, about a pivot axis A of the universal joint 46. From the above, it should be clear that upon rotation of the steering wheel 18, the input shaft 16 and steering column member 12 rotate.

The upper housing 32 is pivotally connected to a pivot carrier 56 which is connected to the steering column member 12 by a jacket tube 58. The upper housing 32 is pivotable about the pivot axis A relative to the pivot carrier 56 and the jacket tube 58. Therefore, the upper housing 32 pivots along with the input shaft 16 relative to the pivot carrier 56 and the steering column member 12. A tilt spring 60 connected between the upper housing 32 and the pivot carrier 56 biases the upper housing 32 to pivot in a counterclockwise direction, as viewed in FIGS. 2 and 3, relative to the pivot carrier 56.

Figure 9:
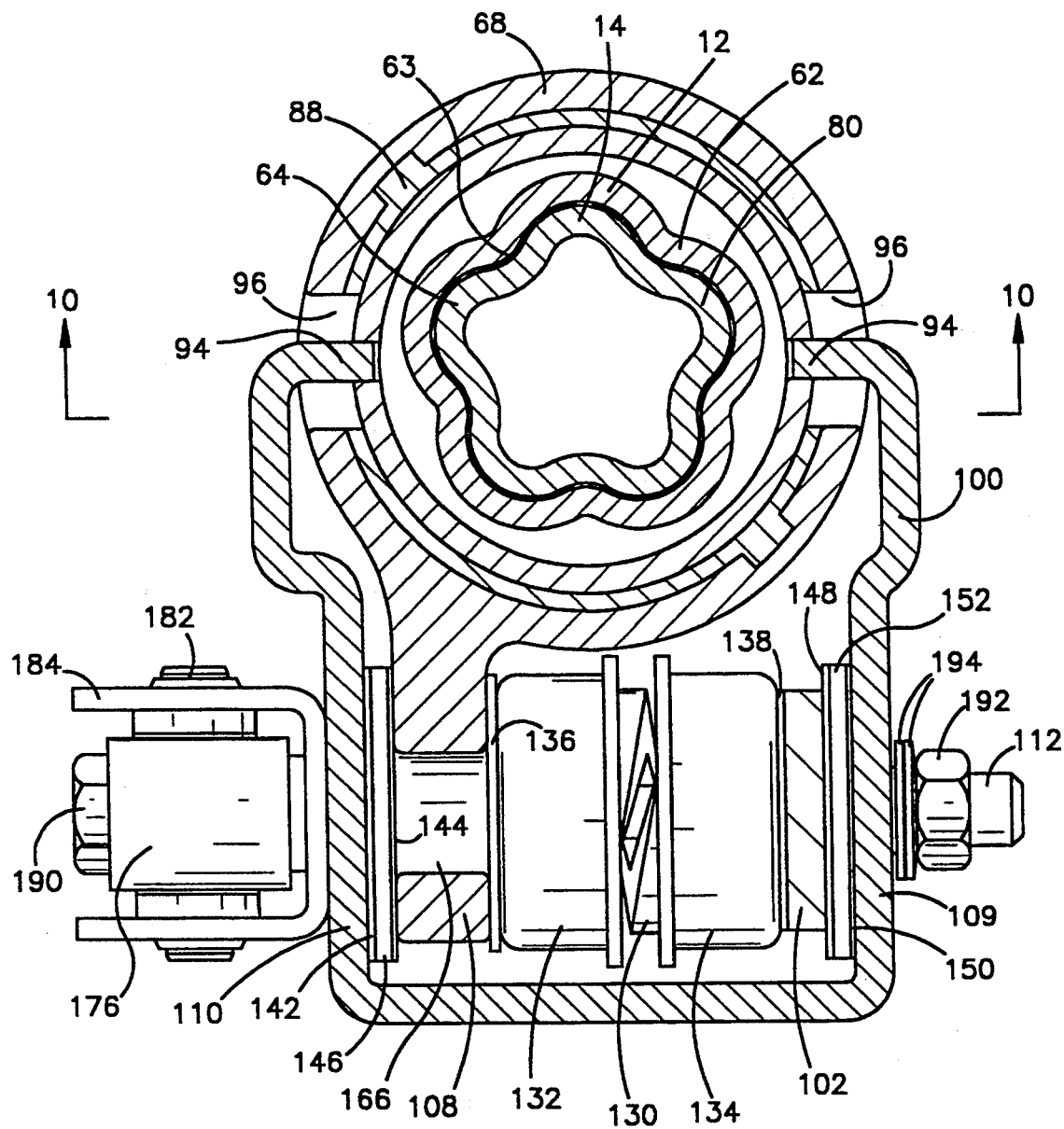
FIG. 9 is a sectional view taken along the line 9—9 of FIG. 1 further illustrating the locking means.

The steering column member 14 extends into a lower tubular shaft portion 62 of the steering column member 12 (FIG. 10). The tubular shaft portion 62 has internal splines 63 (FIG. 9) thereon which mesh with external splines 64 on the steering column member 14. The splines 63 of the steering column member 12 mesh with the splines 64 of the steering column member 14 to effect rotation of the steering column member 14 upon rotation of the steering column member 12.

Steering column member 14 is connected to a yoke 64 (FIG. 10) which is connectable to another yoke connected to an output shaft (not shown). The output shaft is attached to the steering gear (not shown) of the vehicle. The steering column member 14 is supported by a split bearing 66 for rotation relative to a lower housing 68 which is connectable to a frame of the vehicle. An O-ring 70 extends around the bearing 66 to take up wear in the bearing 66. Upon rotation of the steering wheel 18 the input shaft 16 and the steering column members 12, 14 rotate and the rotational movement is transmitted to the output shaft to effect vehicle steering.

The steering column members 12, 14 may be moved axially (telescoped) relative to each other. One end of a spring 74 (shown schematically in FIG. 10) is located within the tubular shaft portion 62 of the steering column member 12 and acts against an end surface 76 of the tubular shaft portion 62. The other end of the spring 74 acts on a surface 78 in a tubular shaft portion 80 of the steering column member 14. The spring 74 acts to bias the steering column member 12 in a vertical direction as viewed in FIG. 10, relative to the steering column member 14.

A bushing 86 (FIGS. 4 and 5) is connected to a lower portion of the jacket tube 58. A bushing 88 is connected to an upper portion of the lower housing 68. The bushings 86 and 88 support the jacket tube 58 and the steering column member 12 for axial movement relative to the lower housing 68.

The pivot carrier 56 includes radially inwardly extending portions 94 (FIGS. 9 and 10) which are connected to the upper portion of the jacket tube 58. The bushing 88 and the lower housing 68 include slots 96. The radially inwardly extending portions 94 of the pivot carrier 56 extend into the slots 96 when the steering column 10 is in a fully compressed position.

Figure 2:
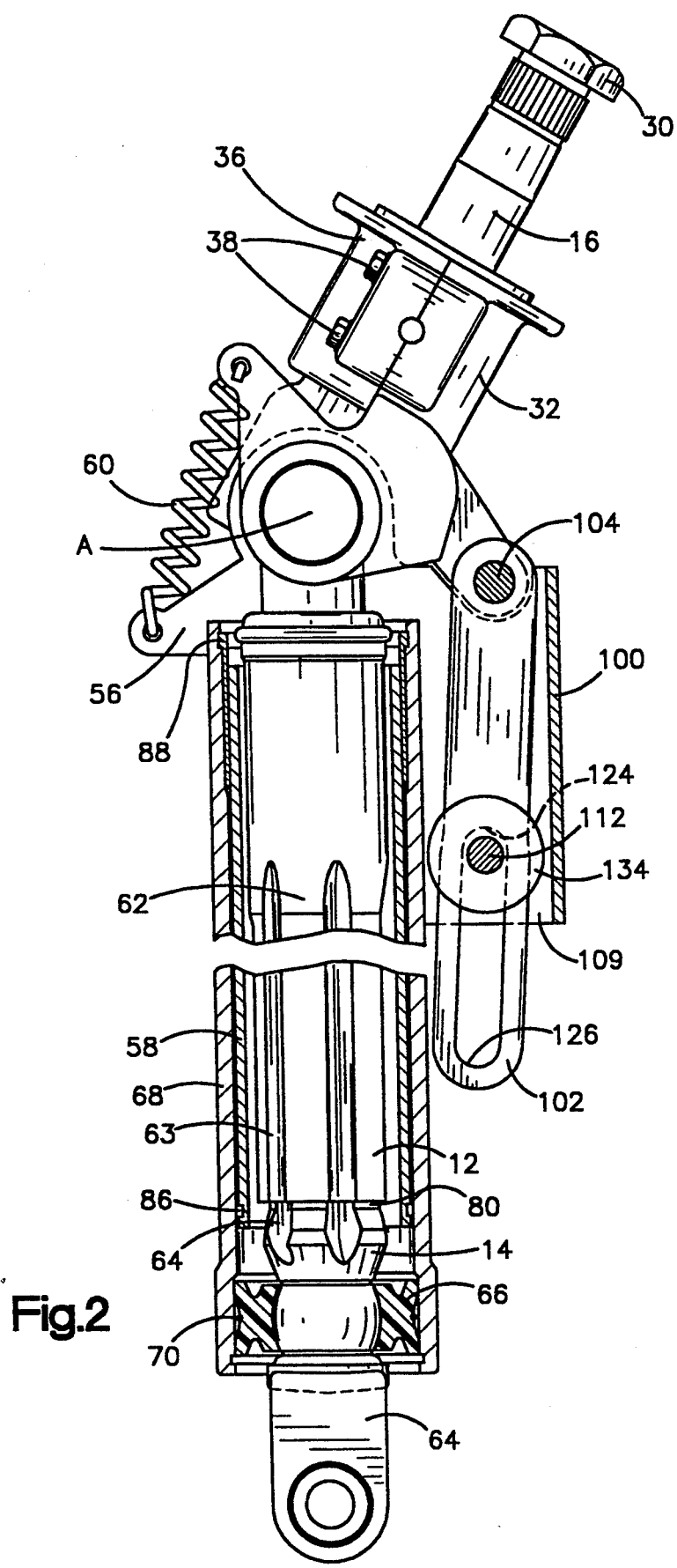
FIG. 2 is a sectional view taken along the line 2—2 of FIG. 1, showing the steering column in a first tilt position.
Figure 3:
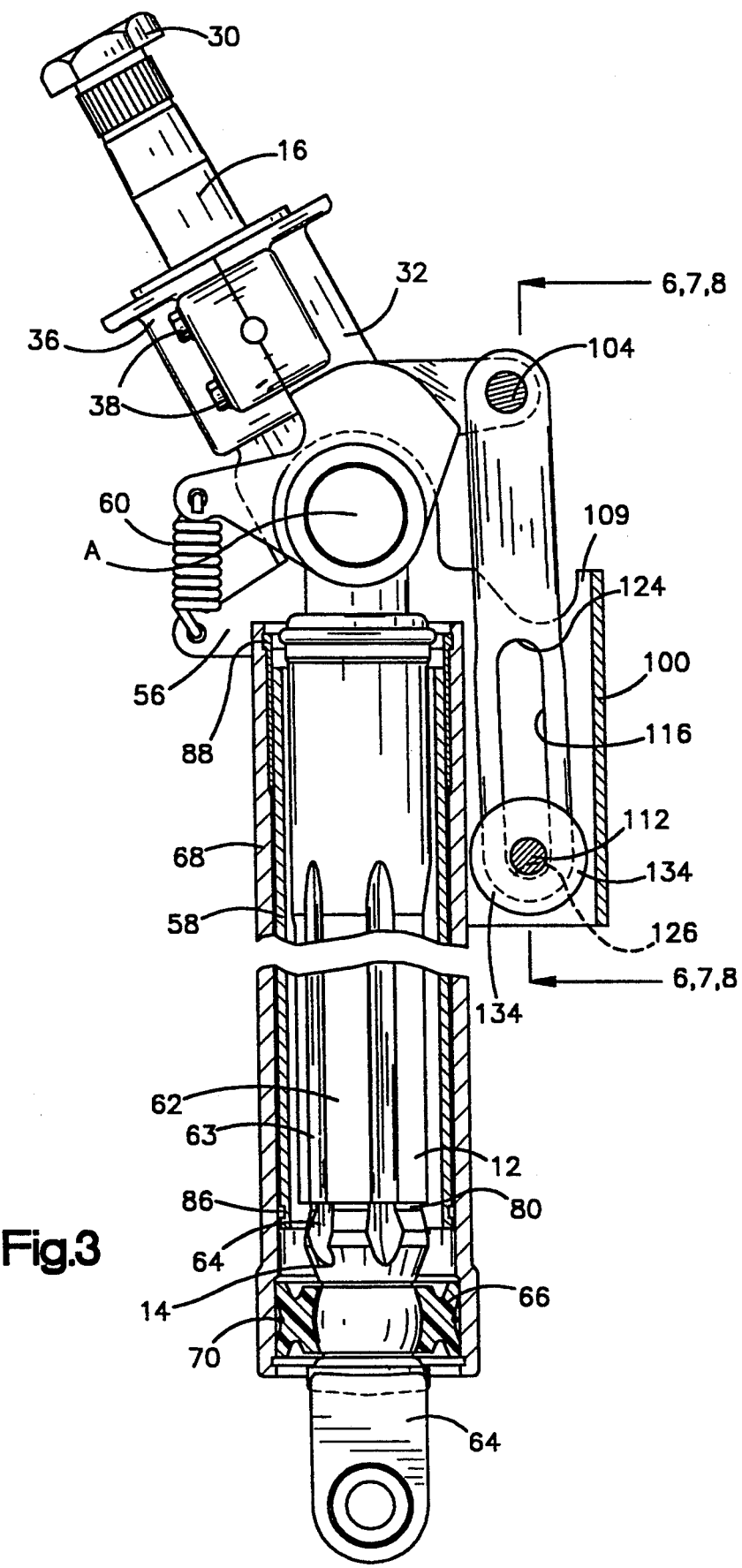
FIG. 3 is a sectional view, generally similar to FIG. 2, showing the steering column in a second tilt position.

Attached to and extending downwardly from the pivot carrier is a bracket 100 (FIG. 1). The bracket 100 (FIG. 9) extends around a tilt lock bar 102. The tilt lock bar 102 is pivotally connected to the upper housing 32 by a pin 104 (FIGS. 2 and 3). The bracket 100 also extends around a flange 108 (FIG. 9) extending from the lower housing 68. The bracket 100 includes a side wall 109 located adjacent the tilt lock bar 102 and a side wall 110 located adjacent the flange 108.

A shaft 112 (FIG. 6) extends through a slot 114 in the flange 108 of the lower housing 68, a slot 116 located in the tilt lock bar 102 and through the side walls 109 and 110 of the bracket 100. The slot 114 in the flange 108 of the lower housing 68 has an upper surface 120 for defining the fully extended position for the steering column 10, see FIG. 5. The slot 114 also has a lower surface 122 for defining a fully compressed position for the steering column 10, see FIG. 4. The tilt lock bar 102 has surfaces 124 and 126 for defining extreme tilt positions of the input shaft 16 relative to the steering column member 12, see FIGS. 2 and 3.

The shaft 112 extends through a spring 130 (FIG. 6) that applies a spring force to force spring cups 132 and 134 away from each other. A friction pad 136 attached to the spring cup 134 is located between spring cup 132 and the flange 108 of the lower housing 68. A friction pad 138 attached to the spring cup 134 is located between the spring cup 134 and the tilt lock bar 102. Friction pads 142 and 144 are spaced apart by a spacer 146 and are located between the flange 108 of the lower housing 68 and the side wall 110 of the bracket 100. Friction pads 148 and 150 are spaced apart by a spacer 152 and are located between the tilt lock bar 102 and the side wall 109. The spring 130 applies forces that clamp the flange 108 of the housing 68 and the tilt lock bar 102 to the bracket 100 to prevent telescoping or tilting of the steering column 10. The friction pads aid in preventing relative movement between the tilt lock bar 102, the flange 108 and the bracket 100.

An actuation sleeve 156 for releasing the force applied by the spring 130 to clamp the tilt lock bar 102 to the side wall 109 of the bracket 100 extends coaxially around a portion of the shaft 112. The actuation sleeve 156 extends through the side wall 109 and a bushing 158 located in the slot 116 in the tilt lock bar 102. The bushing 158 provides for easy movement of the tilt lock bar 102 relative to the shaft 112 when the tilt locking mechanism 22 is released. An axial end portion 160 of the actuation sleeve 156 engages the spring cup 134. The actuation sleeve 156 is axially movable with the shaft 112 relative to the side wall 109 and the bushing 158.

An actuation sleeve 164 for releasing the force applied by the spring 130 to clamp the side wall 110 of the bracket 100 to the flange 108 extends coaxially with another portion of the shaft 112. The actuation sleeve 164 extends through a bushing 166 located in the slot 114 of the flange 108 and through the side wall 110. The bushing 166 provides for easy movement of shaft 112 relative to the flange 108 when the telescope lock mechanism 20 is released. An axial end portion 168 of the actuation sleeve 164 engages the spring cup 132. The actuation sleeve 164 includes a head 170. An annular surface 172 of the head 170 engages a cam surface 174 of a cam 176 connected to a handle 178 for unlocking the locking mechanisms 20 and 22. The actuation sleeve 164 is axially movable relative to the shaft 112, the side wall 110 and the bushing 166.

A pivot pin 182 extends through the cam 176 to pivotally connect the handle 178 and the cam 176 to flanges 184 connected to the side wall 110 of the bracket 100. Therefore, the handle 178 moves along with the bracket 100, the pivot carrier 56 and the steering column member 12 when the steering column member 12 is moved axially relative to the steering column member 14 and the lower housing 68. Therefore, the handle 178 remains at the same distance from the steering wheel 18.

The cam 176 includes a second cam surface 188 that engages a head 190 of the shaft 112. A nut 192 is threadably connected to the shaft 112 on an end opposite the head 190. A pair of Belleville washers 194 are located between the nut 192 and the actuation sleeve 156. The Belleville washers 194 take up wear in the locking mechanisms 20 and 22 so that the locking mechanisms provide reliable locking.

The spring 130 biases the tilt locking mechanism 22 into a position in which the tilt lock bar 102 is clamped to the side wall 109 to prevent the input shaft 16 from pivoting relative to steering column member 12. The spring 130 also biases the handle 178 and cam 176 into the locked position shown in FIG. 6. Upon pivoting the handle 178 and the cam 176 in a clockwise direction, as viewed in FIG. 6, from the locked position to a tilt release position shown in FIG. 7, the cam surface 188 engages the head 190 of the shaft 112. The cam 176 causes the shaft 112 to move axially towards the left, as seen in FIG. 7.

Upon axial movement of the shaft 112 to the left the nut 192 and the Belleville washers 194 cause the actuation sleeve 156 to move along with the shaft 112. The axial end surface 160 of the actuation sleeve 156 engages the spring cup 134 and moves the spring cup 134 and the friction pad 138 to the left to compress the spring 130. The spring force clamping the tilt lock bar 102 to the side wall 109 is released and the spring force clamping the side wall 110 to the flange 108 is not released. The upper housing 32 and the input shaft 16 can pivot about the axis A relative to the pivot carrier 56 and the steering column member 12. When the handle 178 is released after pivotally positioning the input shaft 16, the spring 130 moves the tilt locking mechanism 22 into a locked position, as seen in FIG. 6, to clamp the tilt lock bar 102 to the side wall 109.

When the tilt lock mechanism 22 is released, the tilt lock bar 102 is movable relative to the bracket 100 to position the input shaft 16 in any one of an infinite number of pivot positions. The surface 124 of the slot 116 in the tilt lock bar 102 engages the bushing 158 located in the slot 116 when the input shaft 16 is in an extremely clockwise position about the pivot axis A, as seen in FIG. 2. The surface 126 of the slot 116 engages the bushing 158 when the input shaft 16 is in an extremely counterclockwise position, as seen in FIG. 3. While adjusting the pivot position of the input shaft 16, the tilt lock bar 102 pivots relative to the pivot carrier 32 and about the shaft 112.

Figure 6:
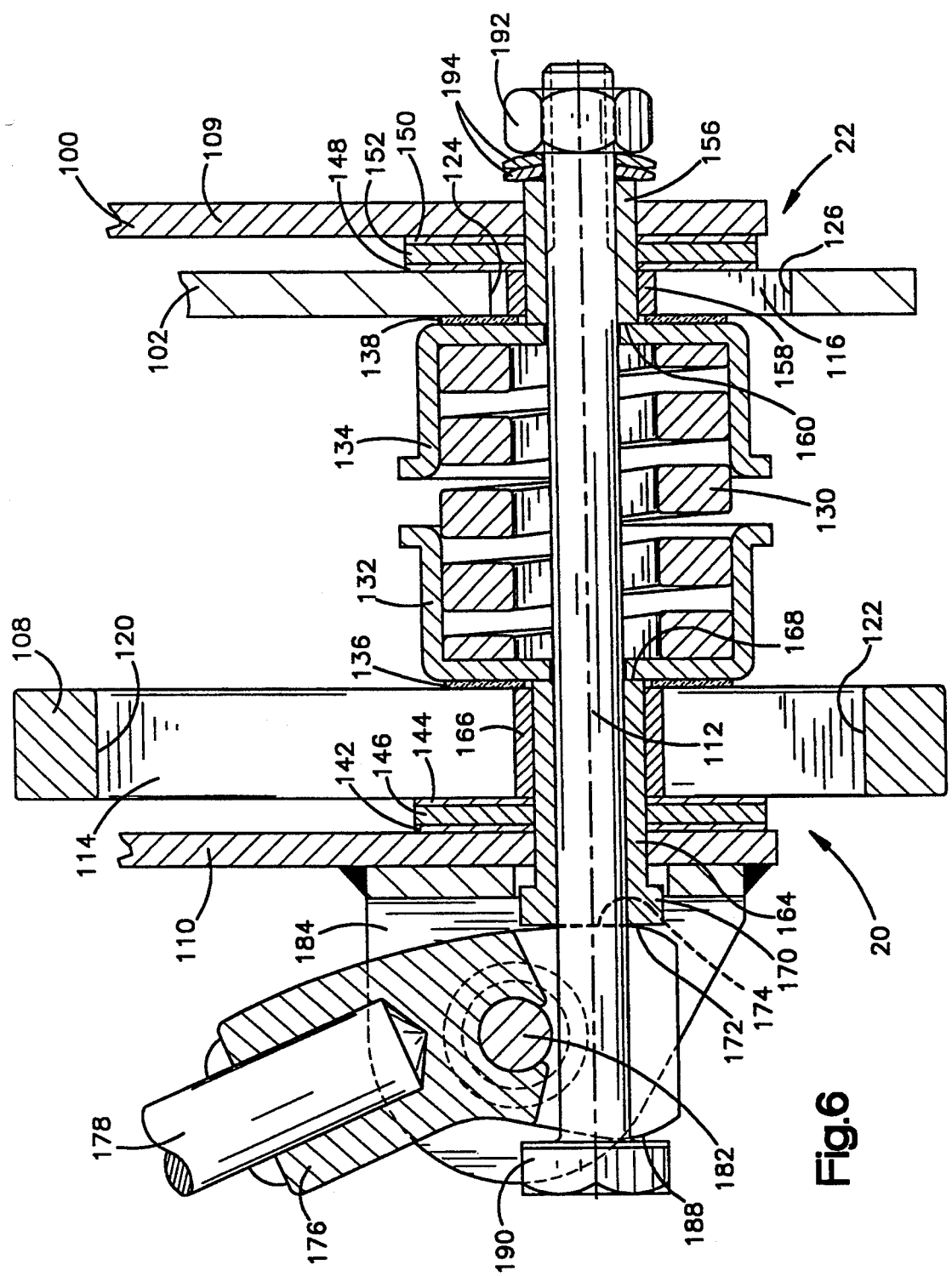
FIG. 6 is an enlarged sectional view of a locking means for locking the steering column in a desired adjusted position.
Figure 7:
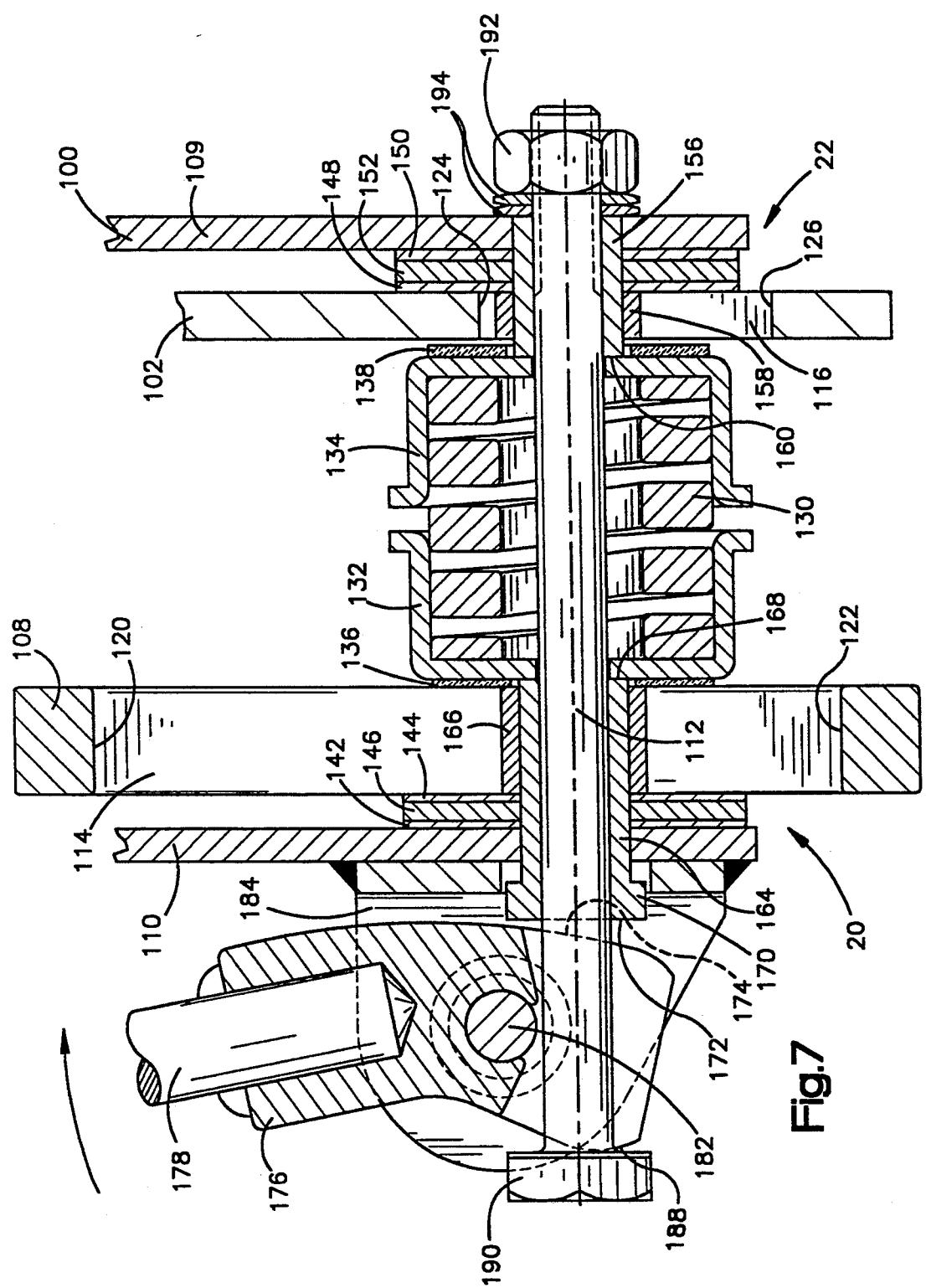
FIG. 7 is an enlarged sectional view of the locking means of FIG. 6 showing the locking means in a condition in which the tilt position of the steering column is adjustable.
Figure 8:
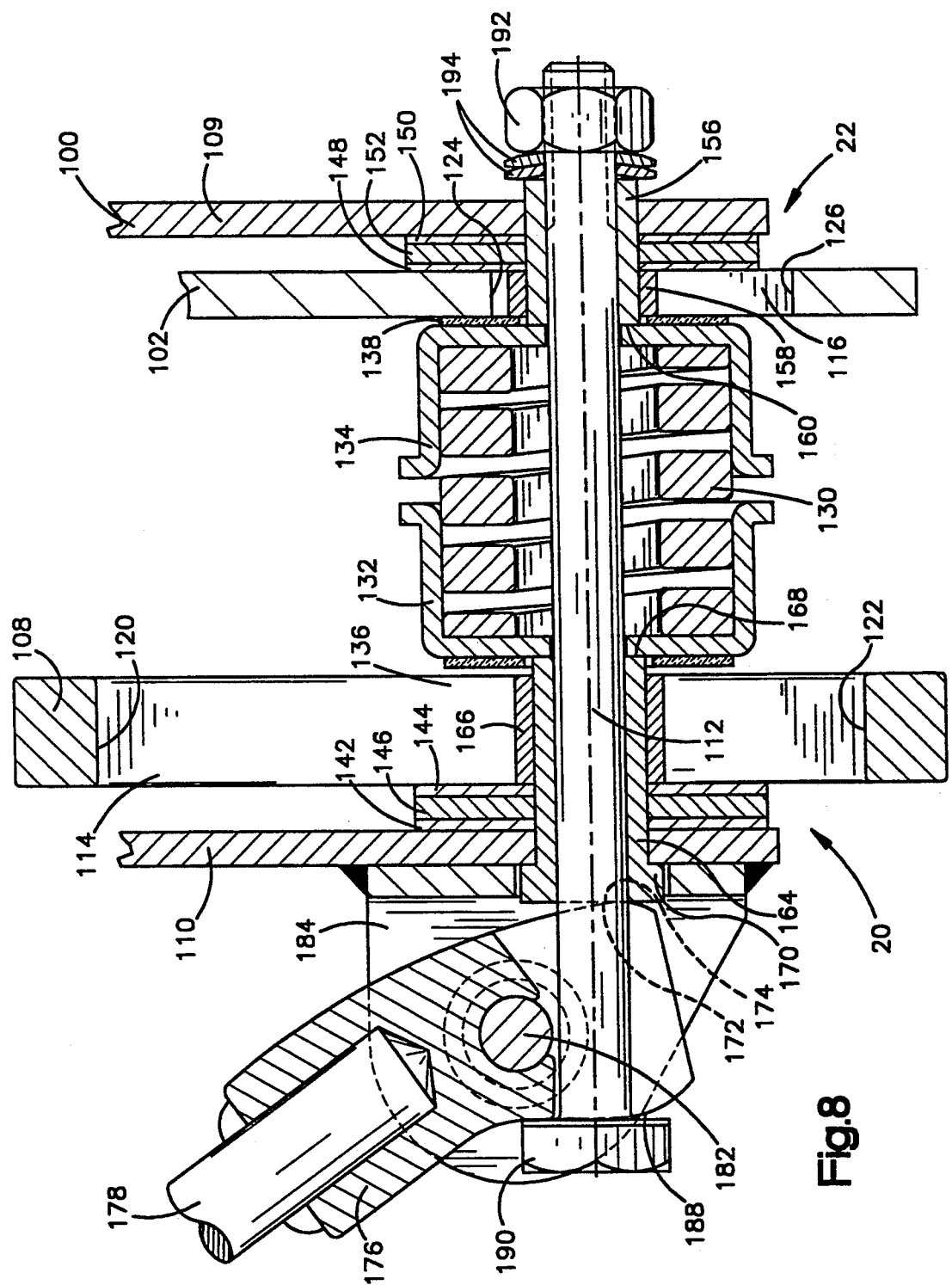
FIG. 8 is an enlarged sectional view of the locking means of FIG. 6 showing the locking means in a condition in which the axial position of the steering column is adjustable.

Upon pivoting the handle 178 and cam 176 in a counterclockwise direction, as viewed in FIG. 6, from the locked position to a telescope release position shown in FIG. 8, the cam surface 174 engages the surface 172 on the head 170 of the actuation sleeve 164. The cam 176 causes the actuation sleeve 164 to move towards the right as viewed in FIG. 8. The axial end surface 168 of the actuation sleeve 164 engages the spring cup 132 to move the spring cup 132 and the friction pad 136 towards the right to compress the spring 130. The spring force clamping the flange 108 of the lower housing 68 to the side wall 110 of the bracket 100 is released and the spring force clamping the tilt lock bar 102 to the side wall 109 is not released. Therefore, the pivot carrier 56 can be moved relative to the lower housing 68 to move the steering column member 12 axially relative to the steering column member 14. When the handle 178 is released after axially positioning the steering column member 12, the spring 130 moves the telescope locking mechanism 22 to its locked position, as seen in FIG. 6, to clamp the side wall 110 to the flange 108.

Figure 4:
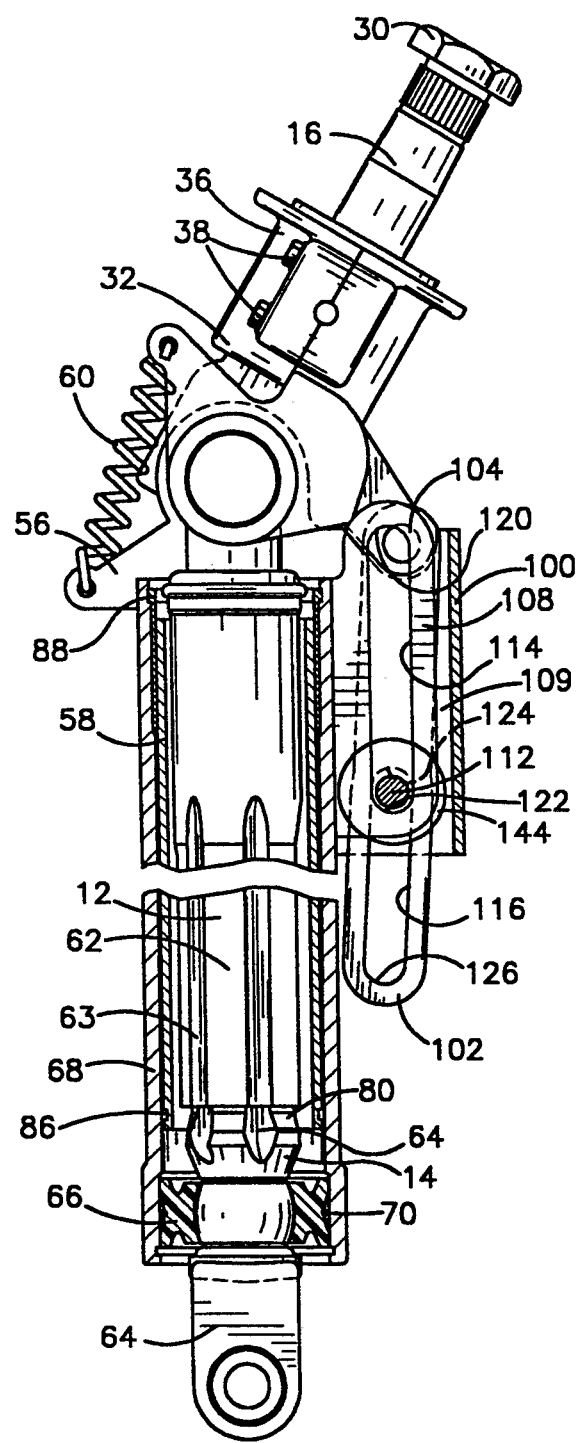
FIG. 4 is a sectional view taken along the line 4—4 of FIG. 1, showing the steering column in a fully compressed position.
Figure 5:
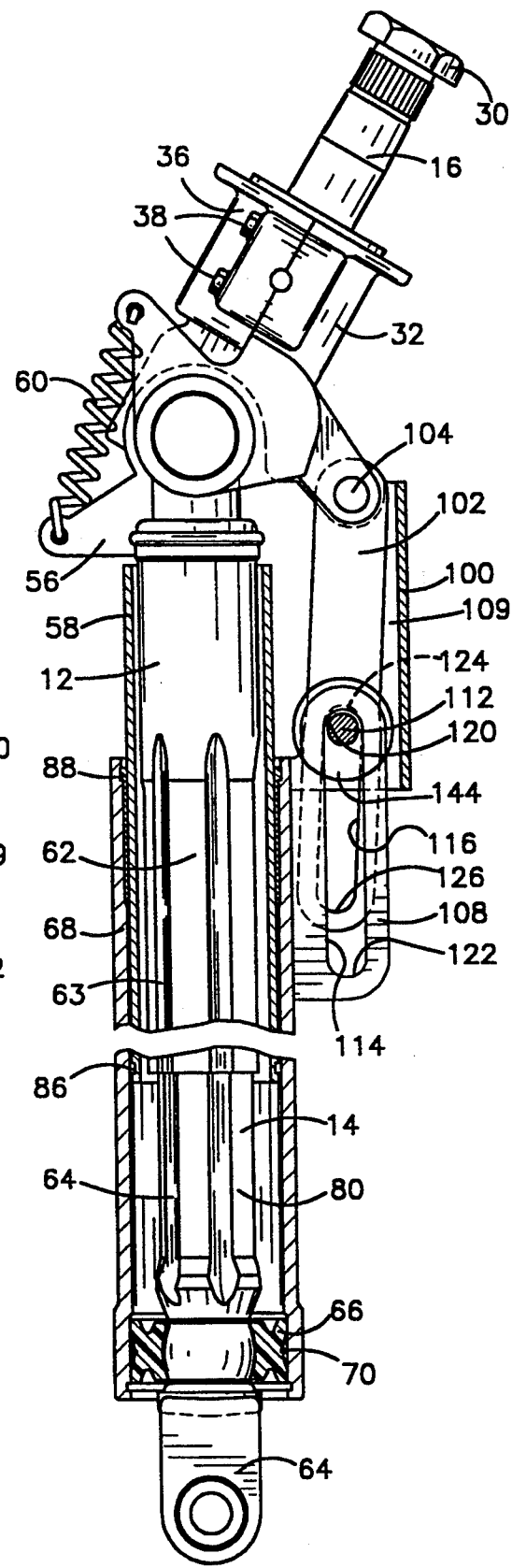
FIG. 5 is a sectional view, generally similar to FIG. 4, showing the steering column in a fully extended position.

When the telescope lock mechanism 20 is released, the bracket 100 and shaft 112 are movable relative to the flange 108 on the lower housing 68 to position the steering column member 12 axially relative to the steering column member 14 in any one of the infinite number of axial positions. The bushing 166 in the slot 114 of the flange 108 engages the surface 122 when the steering column 10 is in the fully compressed position as seen in FIG. 4. The bushing 166 engages the surface 124 of the slot 114 when the steering column is in the fully extended position. While moving the bracket 100, the tilt lock bar 102 remains clamped to the side wall 109 and moves along with the bracket. Thus, the pivot position of the input shaft 16 does not change while adjusting the axial position of the steering column member 12.

The embodiment of the invention illustrated in FIGS. 11-14 is generally similar to the embodiment of the invention illustrated in FIGS. 1-10, similar numerals will be utilized to designate similar components, the suffix letter "a" being associated with the numerals of FIGS. 11-14 to avoid confusion.

The steering column 10a (FIGS. 11 and 12) includes a pair of steering column members 12a, 14a and an input shaft 16a. A vehicle steering wheel (not shown) is attached to the input shaft 16a by a nut 30a. The input shaft 16a and steering column members 12a, 14a rotate upon rotation of the vehicle steering wheel. Steering column members 12a, 14a telescope to effect axial adjustment of the steering column 10a. A releasable telescope locking mechanism 20a (FIG. 11) locks the steering column members 12a, 14a in any one of an infinite number of telescope positions. The input shaft 16a is pivotable relative to the steering column member 12a to effect angular adjustment of the steering wheel. A releasable tilt locking mechanism 22a (FIG. 12) locks the input shaft 16a in any one of an infinite number of pivot positions relative to the steering column member 12a.

The input shaft 16a (FIGS. 11 and 12) extends into an upper housing 32a. Bearings (not shown) located in the upper housing 32a support the input shaft 16a for rotation relative to the upper housing 32a.

The input shaft 16a is connected to the steering column member 12a by a universal joint. The input shaft 16a can pivot, relative to the steering column member 12a, about a pivot axis of the universal joint. It should be clear that upon rotation of the steering wheel the input shaft 16a and the steering column member 12a rotate.

The upper housing 32a is pivotally connected to a pivot carrier 56a which is connected to the steering column member 12a by a jacket tube 58a. The upper housing 32a pivots relative to the pivot carrier 56a. Therefore, the upper housing 32a pivots along with the input shaft 16a relative to the pivot carrier 56a and the steering column member 12a.

The lower steering column member 14a extends into a lower tubular shaft portion 62a of the steering column member 12a. Tubular shaft portion 62a has internal splines thereon which mesh with external splines on the steering column member 14a. The splines of the steering column member 12a mesh with the splines of the steering column member 14a to effect rotation of the steering column member 14a upon rotation of the steering column member 12a.

The steering column member 14a is connected to a yoke 64a which is connectable to another yoke connected to an output shaft (not shown). The output shaft is attached to the steering gear (not shown) of the vehicle. The steering column member 14a is supported by a bearing 66a for rotation relative to a lower housing 68a. The lower housing 68a is connectable to a frame of the vehicle. Upon rotation of the steering wheel the input shaft 16a and the steering column members 12a, 14a rotate and the rotational movement is transmitted to the output shaft to effect vehicle steering.

A bushing 86a is connected to a lower portion of the jacket tube 58a. A bushing 88a is connected to an upper portion of the lower housing 68a. The bushings 86a and 88a support the jacket tube 58a and the steering column member 12a for axial movement relative to the lower housing 68a.

The telescope locking mechanism 20a (FIGS. 11 and 13) includes a telescope lock bar 200 fixedly attached to the lower housing 68a by a pin 202. The telescope lock bar 200 extends through a tubular member 204. The tubular member 204 is connected by a pin 208 to a bracket 206 which extends from the pivot carrier 56a.

A pair of bushings 212 and 214 are located within the tubular member 204. The bushings 212 and 214 are connected to the tubular member 204 and support the tubular member for axial movement relative to the telescope lock bar 200. The bushings 212 and 214 are located on either side of a lever 216. A coil spring 220 is connected at one end to the bushing 212 and at its other end to the lever 216. Another coil spring 222 is connected at one end to the bushing 214 and at its other end to the lever 216. The springs 220 and 222 are normally tightly wound upon the periphery of the telescope lock bar 200 so that, when fully wound, they grip the telescope lock bar and prevent relative movement between the telescope lock bar and the tubular member 204. Rotation of the lever 216 about the axis of the telescope lock bar 200 causes the springs 220 and 222 to become partially unwound and release their grip on the telescope lock bar 200.

The lever 216 has a control extension 226 integral with a cylindrical body portion 228. The body portion 228 extends around portions of the springs 220 and 222. An inner end of each of the springs 220 and 222 is retained between an edge of the body portion 228 and the control extension 226 to fix the inner end of each of the springs to the lever 216. Outer ends of the springs 220 and 222 are fixed within the bushings 212 and 214, respectively, and thus, to the tubular member 204. Thus, when the lever 216 is rotated about the telescope lock bar 200, the outer ends of the springs 220 and 222 can not be moved about the axis of the telescope lock bar 200 and the force imparted to the springs by the lever 216 causes the springs to unwind.

Figure 11:
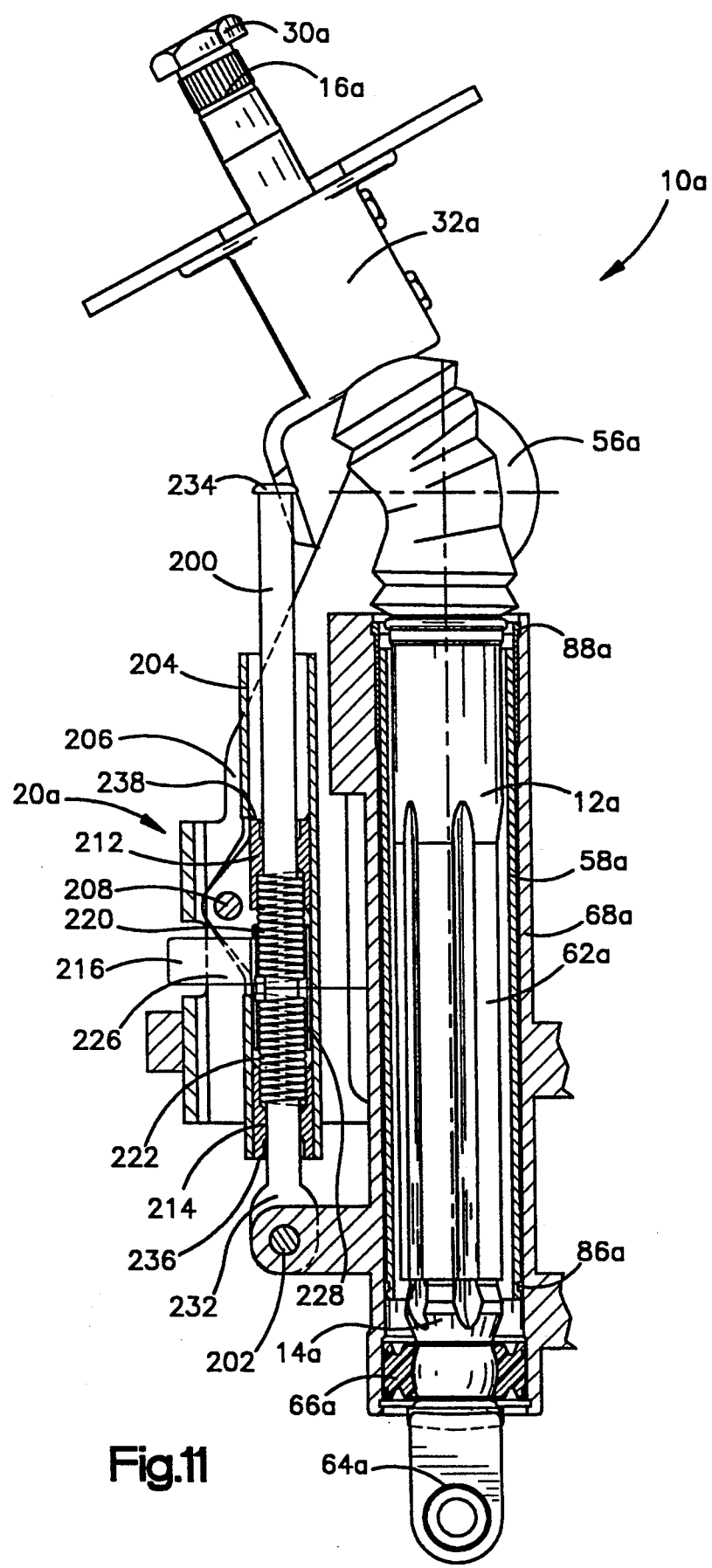
FIG. 11 is a sectional view of a second embodiment of the present invention showing a telescope locking means.
Figure 12:
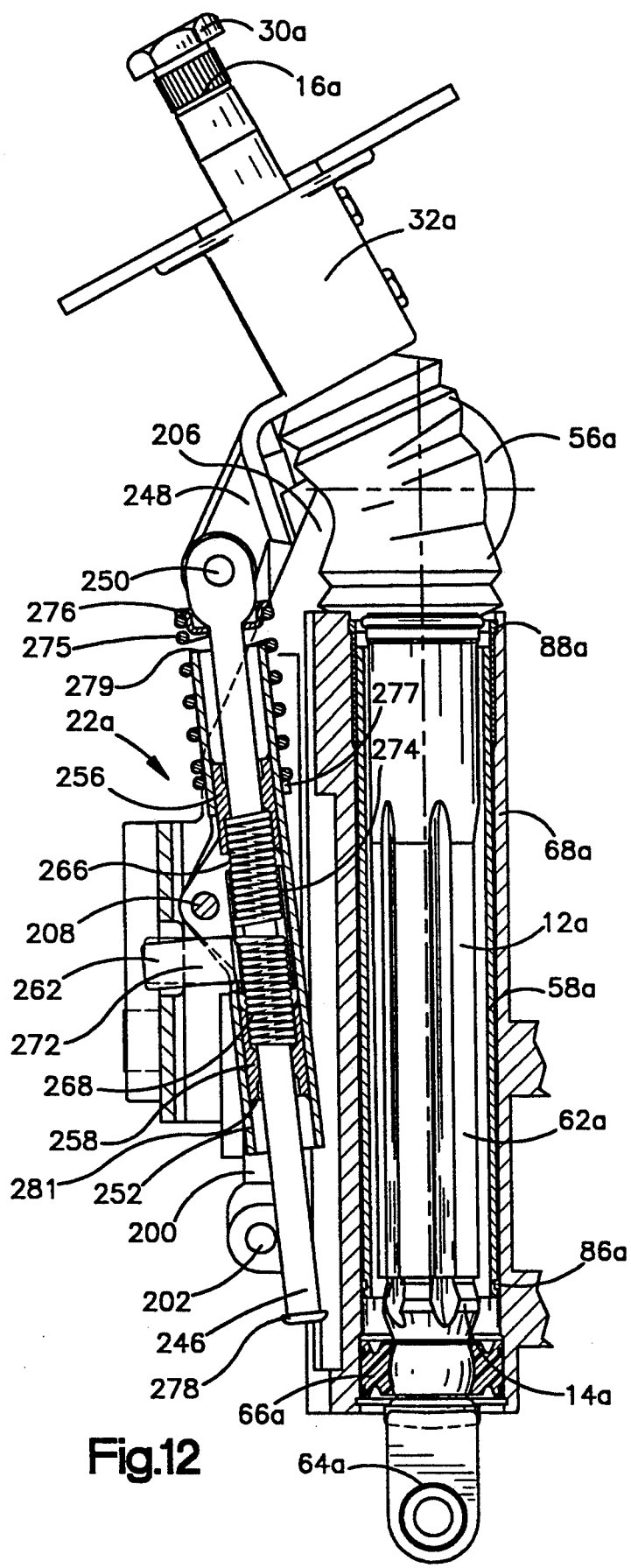
FIG. 12 is a sectional view of the steering column of FIG. 11 showing a tilt locking means.
Figure 13:
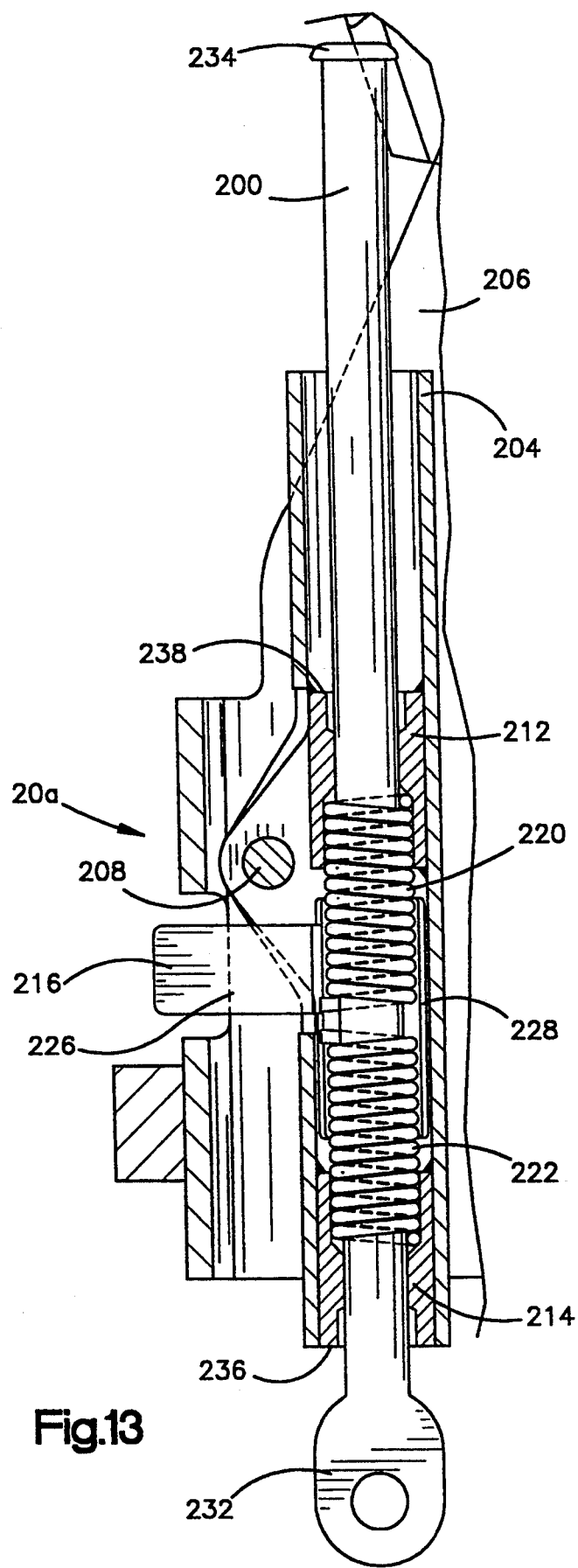
FIG. 13 is an enlarged sectional view of the telescope locking means of FIG. 11.

The telescope lock bar 200 has a lower flange 232, as viewed in FIG. 11, through which the pin 202 extends to connect the telescope lock bar to the lower housing 68a and define a fully compressed position of the steering column 10a. An upper flange 234 of the telescope lock bar 200 can be received in the tubular member 204 and defines a fully extended position of the steering column 10a. When a lower surface 236 of the bushing 214 engages the flange 232 of the telescope lock bar 200, the steering column 10a is in the fully compressed position. When an upper surface 238 of the bushing 212 engages the flange 234 of the telescope lock bar 200, the steering column 10a is in the fully extended position. A spring (not shown), similar to spring 74, located within steering column members 12a and 14a biases the steering column member 12a in a vertical direction, as viewed in FIG. 11, relative to steering column member 14a.

The tilt locking mechanism 22a (FIG. 12) is similar to the telescope locking mechanism 20a and includes a tilt lock bar 246 pivotally attached to an extension 248 of the upper housing 32a by a pin 250. The tilt lock bar 246 extends through a tubular member 252. The tubular member 252 is pivotally connected by the pin 208 to the bracket 206.

A pair of bushings 256 and 258 are located within the tubular member 252. The bushings 256 and 258 are connected to the tubular member 252 and support the tilt lock bar 246 for axial movement relative to the tubular member. The bushings 256 and 258 are located on either side of a lever 262. A coil spring 266 is connected at one end to the bushing 256 and at its other end to the lever 262. Another coil spring 268 is connected at one end to the bushing 258 and at its other end to the lever 262. The springs 266 and 268 are normally tightly wound upon the periphery of the tilt lock bar 246 so that, when fully wound, they grip the tilt lock bar and prevent relative movement between the tilt lock bar and the tubular member 252. Rotation of the lever 262 about the axis of the tilt lock bar 246 causes the springs 266 and 268 to become partially unwound and release their grip on the tilt lock bar 246.

The lever 262 has a control extension 272 integral with a cylindrical body portion 274. The body portion 274 extends around portions of the springs 266 and 268. An inner end of each of the springs 266 and 268 is retained between an edge of the body portion 274 and the control extension 272 to fix the inner end of each of the springs to the lever 262. Outer ends of the springs 266 and 268 are fixed within the bushings 256 and 258, respectively, and thus, to the tubular member 252. Thus, when the lever 262 is rotated about the tilt lock bar 246, the outer ends of the springs 266 and 268 cannot be moved about the axis of the tilt lock bar 246 and the force imparted to the springs by the lever 262 causes the springs to unwind.

A tilt spring 275 extends between a spring retainer flange 276 on the tilt lock bar 246 and a flange 277 located on the tubular member 252. The tilt spring 275 biases the input shaft 16a to pivot in a clockwise direction, as viewed in FIG. 12, relative to the steering column member 12a. The spring retainer flange defines an extreme counterclockwise pivot position of the input shaft 16a. A lower flange 278 of the tilt lock bar 246 can De received in the tubular member 252 and defines an extreme clockwise pivot position of the input shaft 16a. When the spring retainer flange 276 of the tilt lock bar 246 engages an upper surface 279 of the tubular member 252, the input shaft 16a is in the extreme counterclockwise pivot position. When the flange 278 of the tilt lock bar 246 engages a lower surface 281 of the bushing 258, the input shaft 16a is in the extreme clockwise pivot position.

The bracket 206 includes a portion 280 (FIG. 14) that extends adjacent to the levers 216 and 262. The levers 216 and 262 extend through a slot 282 in the portion 280 of the bracket 206. A cam 286 is pivotally supported on the portion 280 by a pin 288 connected to the portion 280. A handle (not shown) is connected to the cam 286 for pivoting the cam. Another pin 290 connected to the portion 280 extends into a slot 292 in the cam 286. The pin 290 and slot 292 cooperated to guide the pivotal movement of the cam 286.

The cam 286 extends transverse to the slot 282 and between the levers 216 and 262. Upon pivoting the cam 286 in one direction the cam 286 engages the lever 216 to release the telescope locking mechanism 20a. Upon pivoting the cam 286 in another direction the cam 286 engages the lever 262 to unlock the tilt locking mechanism 22a.

Figure 14:
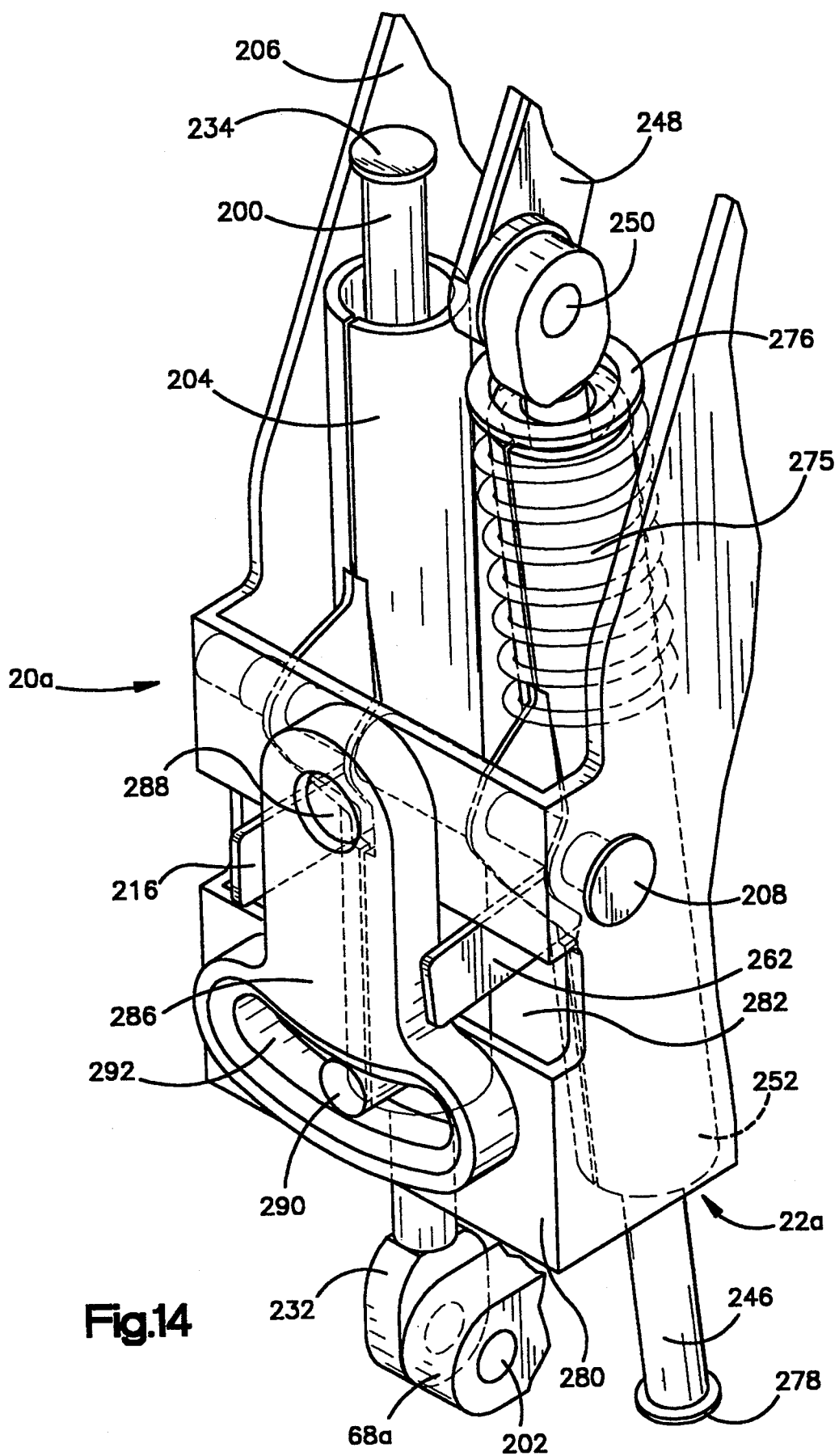
FIG. 14 is an enlarged pictorial illustration of the telescope and tilt locking means of FIGS. 11 and 12.

The springs 220 and 222 of the telescope locking mechanism 20a bias the lever 216 into engagement with the cam 286. The springs 220 and 222 are also biased to clamp the telescope lock bar 200 to prevent the steering column member 12a from being moved axially relative to the steering column member 14a. The springs 266 and 268 bias the lever 262 into engagement with the cam 286. The springs 266 and 268 are also biased to clamp the tilt lock bar 246 and prevent the input shaft 16a from pivoting relative to the steering column member 12a. Thus, the springs 220 and 222 of the telescope locking mechanism 20a and the springs 266 and 268 of the tilt locking mechanism 22a bias the cam 286 into a locked position, as seen in FIG. 14, in which the steering column member 12a is prevented from moving relative to the steering column member 14a and the input shaft 16a is prevented from pivoting relative to the steering column member 12a.

Upon pivoting the cam 286 from its locked position toward the lever 216 the springs 220 and 222 are unwound and the tubular member 204 can move relative to the telescope lock bar 200. Therefore, the steering column member 12a can be moved axially relative to the steering column member 14a. Upon release of the cam 286 after the steering column member 12a has been axially positioned relative to the steering column member 14a, the springs 220 and 222 cause the lever 216 to move the cam to its locked position.

When the telescope lock mechanism 20a is released, the bracket 206 and tubular member 204 are movable relative to the telescope lock bar 200 connected to the lower housing 68a to position the steering column member 12a axially relative to the steering column member 14a in any one of an infinite number of axial positions. While moving the bracket 206, the tilt lock bar 246 remains fixed to the tubular member 252. Thus, the pivot position of the input shaft 16a does not change while adjusting the axial position of the steering column member 12a.

Upon pivoting the cam 286 from its locked position toward the lever 262 the springs 266 and 268 are unwound to allow the tilt lock bar 246 to move relative to the tubular member 252. Therefore, the input shaft 16a can pivot relative to the steering column member 12a. Upon release of the cam 286 after the input shaft 16a has been pivotally positioned relative to the steering column member 12a, the springs 266 and 268 cause the lever 262 to move the cam 286 to its locked position.

When the tilt locking mechanism 22a is released, the tilt lock bar 246 is movable relative to the tubular member 252 and the bracket 206 to position the input shaft 16a in any one of an infinite number of pivot positions. While adjusting the pivot position of the input shaft 16a, the tilt lock bar 246 pivots relative to the pivot carrier 32a and the tilt lock bar and the tubular member 252 pivot together relative to the bracket 206.

Although both embodiments have been shown with handles for releasing the telescope locking mechanism and the tilt locking mechanism, it is contemplated that any known means for releasing the locking mechanisms can be used. For example, solenoids could be mounted on the steering column to release the telescope locking mechanism and the tilt locking mechanism. A switch located on the floor of the vehicle, in the steering wheel, or any other convenient location could be used to activate the solenoids. Also, a cable could be connected between the locking mechanisms and a foot or hand operated lever not located on the steering column for releasing the locking mechanisms.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:
   first and second coaxial steering column members, said first steering column member being movable axially relative to said second steering column member;
   an input shaft connectable with a steering wheel and supported on said first steering column member for pivotable movement relative to said first steering column member about an axis extending transverse to the direction of relative axial movement between the first and second steering column members;
   a first means for locking said first steering column member in any one of an infinite number of axial positions relative to said second steering column member;
   a second means for locking said input shaft in any one of an infinite number of pivot positions relative to said first steering column member; and
   a member movable to unlock said first and second locking means, said member having one position in which said first locking means is unlocked and said second locking means is locked, said member having another position in which said second locking means is unlocked and said first locking means is locked.

2. A steering column as set forth in claim 1 further including means for biasing said input shaft to pivot relative to said first steering column.

3. A steering column as set forth in claim 1 further including an upper housing pivotable relative to said first steering column member and a tilt member pivotally connected to said upper housing, said tilt member having a slot for receiving a portion of said second locking means, said slot in said tilt member defining the limits of pivotable movement of said input shaft relative to said first steering column member.

4. A steering column as set forth in claim 1 further including a housing connectable to a vehicle frame and a jacket tube axially movable relative to said housing and said second steering column member, said first steering column member extending axially within and connected to said jacket tube, said jacket tube having a first end portion with a bushing attached thereto, said bushing being in engagement with said housing to support said jacket tube and said first steering column member for movement relative to said housing and said second steering column member.

5. A steering column as set forth in claim 1 further including a lower housing connectable to a vehicle frame, said lower housing including an axially extending slot for receiving a portion of said first locking means, said axially extending slot defining the limits of movement between said first and second steering column members.

6. A steering column as set forth in claim 1 wherein said member comprises a handle, said handle being movable with said first steering column member relative to said second steering column member.

7. A steering column as set forth in claim 1 further including means for biasing said first steering column member to move relative to said second steering column member to lengthen the axial length of said steering column.

8. A steering column as set forth in claim 7 wherein said biasing means includes a spring, said spring being located in axially extending passages in said first and second steering column members.

9. A steering column comprising:
   first and second coaxial steering column members, said first steering column member being movable axially relative to said second steering column member;
   an input shaft connectable with a steering wheel and pivotable about an axis extending transverse to the direction of relative movement between the first and second steering column members;
   means for locking said first steering column member in any one of an infinite member of axial positions relative to said second steering column member and for locking said input shaft in any one of an infinite number of pivot positions; and
   a member to unlock said locking means, said member having one position in which said first steering column member is movable relative to said second steering column member and said input shaft is prevented from pivoting and another position in which said input shaft is pivotable and said first steering column member is prevented from moving relative to said second steering column member.

10. A steering column as set forth in claim 9 wherein said input shaft is pivotable relative to said first steering column member and movable with said first steering column member relative to said second steering column member.

11. A steering column as set forth in claim 9 wherein said member has a locked position in which said first steering column member is prevented from moving relative to said second steering column member and said input shaft is prevented from pivoting, said locking means comprising means for biasing said members to its locked position.

12. A steering column as set forth in claim 9 wherein said member comprises a handle, said handle being movable with said first steering column member relative to said second steering column member.

13. A steering column comprising:
   first and second coaxial steering column members, said first steering column member being movable axially relative to said second steering column member;
   an input shaft connectable with a steering wheel and supported on said first steering column member for pivotable movement relative to said first steering column member about an axis extending transverse to the direction of relative axial movement between the first and second steering column members;

a first means for locking said first steering column member in any one of an infinite number of axial positions relative to said second steering column member;

a second means for locking said input shaft in any one of an infinite number of pivot positions relative to said first steering column member a member movable to unlock said first and second locking means, said member having one position in which said first locking means is unlocked and said second locking means is locked, said member having another position in which said second locking means is unlocked and said first locking means is locked;

a housing connectable to a frame of a vehicle, said first locking means comprising a first member connected to said first steering column member, a second member connected to said housing, and means for applying a friction force between said first and second members to prevent relative movement between said first and second members.

14. A steering column as set forth in claim 13 wherein said second locking means comprises said first member connected to said first steering column member, a third member connected to said input shaft, and means for applying a friction force between said first and third members to prevent relative movement between said first and third members.

15. A steering column comprising: first and second coaxial steering column members, said first steering column member being movable axially relative to said second steering column member;

an input shaft connectable with a steering wheel and supported on said first steering column member for pivotable movement relative to said first steering column member about an axis extending transverse to the direction of relative axial movement between the first and second steering column members;

a first means for locking said first steering column member in any one of an infinite number of axial positions relative to said second steering column member;

a second means for locking said input shaft in any one of an infinite number of pivot positions relative to said first steering column member, said second locking means comprising a first member connected to said first steering column member, a second member connected to said input shaft, and means for applying a friction force between said first and second members; and a member movable to unlock said first and second locking means, said member having one position in which said first locking means is unlocked and said second locking means is locked, said member having another position in which said second locking means is unlocked and said first locking means is locked.

16. A steering column comprising:

first and second coaxial steering column members, said first steering column member being movable axially relative to said second steering column member;

an input shaft connectable with a steering wheel and supported on said first steering column member for pivotable movement relative to said first steering column member about an axis extending transverse to the direction of relative axial movement between the first and second steering column members;

a first means for locking said first steering column member in any one of an infinite number of axial positions relative to said second steering column member;

a second means for locking said input shaft in any one of an infinite number of pivot positions relative to said first steering column member; and a member movable to unlock said first and second locking means, said member having one position in which said first locking means is unlocked and said second locking means is locked, said member having another position in which said second locking means is unlocked and said first locking means is locked, said member having a locked position in which said first and second locking means are locked, said first and second locking means comprising means for biasing said member into its locked position so that said first and second locking means are normally locked.

* * * * *